Patented Feb. 9, 1937

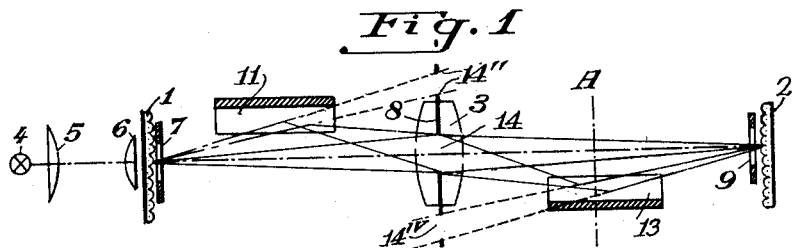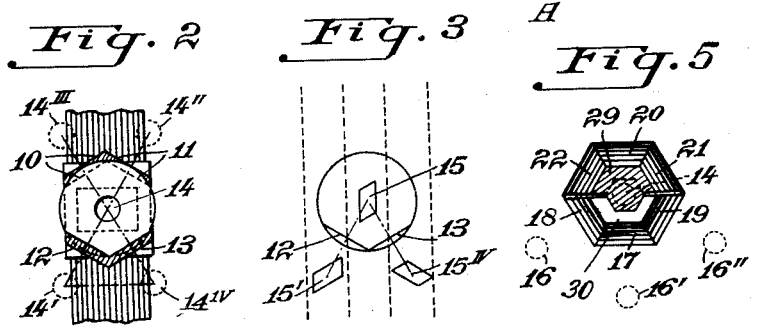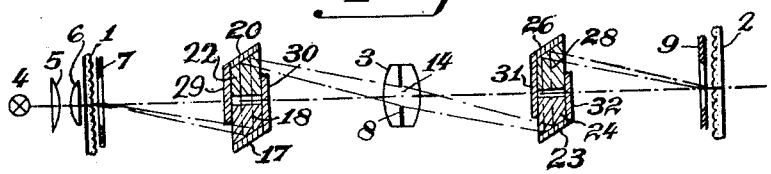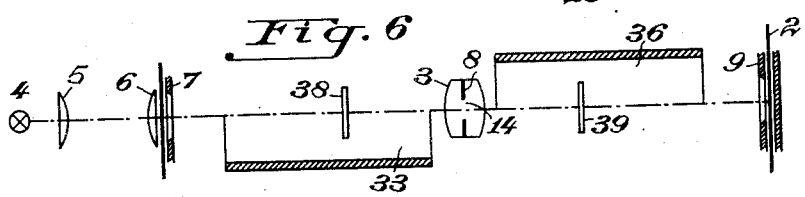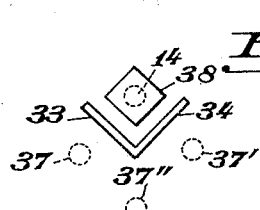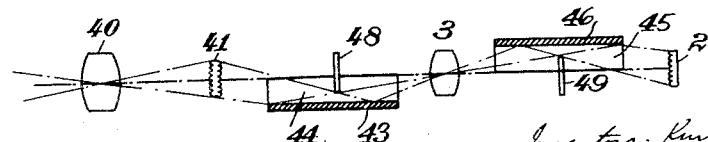

2,070,179

UNITED STATES PATENT OFFICE 2,070,179

DEVICE FOR COPYING IMAGES ON LENTICULATED FILMS

Kurt Räntsch, Berlin-Teltow-Seehof, and Hans Arni, Berlin-Ruhleben, Germany, assignors to Opticolor, Aktiengesellschaft, Glarus, Switzerland, a corporation of Switzerland Application November 10, 1934, Serial No. 752,530
In Germany November 10, 1933

8 Claims. (Cl. 88—24)

In the copending application of Kurt Räntsch relating to "Printing-apparatus for lenticulated films" Ser. No. 688,545 there are described apparatus for duplicating images on lenticulated films by copying. In the case of these appliances the reproduction on the copying film of the image on the original film is obtained by means of a lens of comparatively small aperture and by suitable means it is ensured that the lens aperture can be seen from the film in various directions. In the case of the most important appliances described in the main patent plane mirrors are arranged at both sides of the lens, which are in parallel with each other as well as with the optical axis. From the direction of the films images of the lens opening can be seen in these mirrors. Furthermore, both films can be seen in exactly opposite directions from the objective.

A drawback of these appliances, however, is that from the direction of the films an infinite number of images of the lens aperture can be seen. The share of scattered light striking the film to be exposed is therefore comparatively high and the copies are slightly blurred, so that, on the whole, it is difficult to obtain clear and rich colors.

In order to eliminate this defect the auxiliary appliances used for producing the images of the objective as seen from the direction of the films are so designed and arranged, in accordance with the present invention that there is obtained a definite number, and a small number only, of images of the objective. For this purpose the arrangement is preferably made in such a way that from each film the opening of the optical system or its images cannot be seen in a straight line. Instead they form the corners of a regular or an irregular polygon. As, moreover, generally only three primary colors are used for producing colored photographs, by means of lenticulated films, it is furthermore of advantage if the objective can be seen in exactly three directions forming the corners of a triangle.

The new appliances can be so designed that the copying film is struck by such light only as has passed the auxiliary devices for obtaining images of the lens opening or that from the direction of the films the opening of the objective can be seen directly and beside the same the images of the lens opening obtained by means of the auxiliary devices.

Some of the appliances in accordance with this invention are illustrated.

Figs. 1, 4 and 6 represent longitudinal sections of three different arrangements.

Figs. 2, 5 and 7 show sections perpendicular to the optical axis of the objectives used for the appliances shown in Figs. 1, 4 and 6.

Fig. 3 represents a special type of objective diaphragm which may be used with the appliances shown in Fig. 1.

Fig. 8 represents a section through an appliance the design of which is likewise based on the principle underlying the present invention and which serves for taking pictures on lenticulated films.

Fig. 9 is a section perpendicular to the optical axis of the appliance shown in Fig. 8.

In the case of the equipment shown in Fig. 1, film 1 to be copied which passes through gate 7, is illuminated by means of light source 4 and condenser lenses 5 and 6 and is imaged on the unexposed film 2 through objective 3, which can be provided with a diaphragm 8 with aperture 14. This film passes through gate 9. In order to bring about that from the direction of the films it is possible to see not only the lense aperture directly, but also images of this aperture, two plane mirrors each, 10 and 11 or 12 and 13, are arranged in parallel to the optical axis on both sides of the objective. The effect of these mirrors can best be seen from Fig. 2 showing a section perpendicularly to the axis along the chain dotted straight line A—A. Mirrors 11 and 12 as well as mirrors 10 and 13 are in parallel with each other. From film 2 image 14' of diaphragm aperture 14 can be seen in mirror 12. Correspondingly, image 14'' is seen in mirror 11 from film 1. The distance of the mirrors from the optical axis is so dimensioned that the light passing via mirrors 11 and 12 serves for copying those parts of the image which correspond to one of the lateral filter zones.

In a similar way image $14^{III}$ can be seen in mirror 10 from film 1, and image $14^{IV}$ in the mirror 13 from film 2. The light passing via these mirrors serves for copying those image parts 10 which correspond to the other lateral filter zone. If, therefore, in the case of the films in question the lenticular elements are in parallel with the longitudinal direction, objective images 14' and $14^{IV}$ must be visible at the same distance from each other as parts of the lateral filter zones when exposing or projecting. The distance in which images 14' and $14^{IV}$ are seen from each other is preferably just as large as the distance in which the centers of the two lateral filter zones are seen when exposing or projecting. The lense aperture 14 is then preferably seen in the same direction as the center of the central filter zone. If a film is used in the case of which the lenticular elements run in any other angle to the longitudinal direction of the film, the mirrors must be turned by a corresponding angle around the optical axis of the objective, so that preferably the connecting line between lens images 14' and 14$^{IV}$ is perpendicular to the direction of the lenticular elements. On the other hand the direction of the lenticular elements can also be vertical to the connecting line between 14 and 14'.

It will be seen that from each film the lens aperture is seen in not more than three directions if the angle formed by the two mirrors 12 and 13 is sufficiently large, which is sure to be the case if the angle formed by these two mirrors is 120 degrees or larger. Depending on the size of the gate and on the focal distance of the lens it is also possible to use smaller angles without seeing more than two images of lens aperture 14. Without necessitating special diaphragms to screen the harmful stray radiation only such light can pass from the original to the copying film in the case of appliances represented in Figs. 1 and 2 as is actually required for copying all parts of the image.

In some cases it is of advantage to use differently shaped lens apertures for copying the image parts allotted to the various filter zones, so that the diffusion of light which is produced when copying from one zone into another is influenced at will. In order to show how this can be effected in the case of the appliances as per Figs. 1 and 2, the drawing as per Fig. 2 is reiterated in the form of a diagram in Fig. 3; in this case, however, lens opening 15, which is shown instead of opening 14 in Figs. 1 and 2, has the shape of a parallelogram. It will be seen that the images 15' and 15$^{IV}$ seen from this opening 15 in mirrors 12 and 13 fill up parts of different width of the filter zones which are used for the exposure and which in Fig. 3 are illustrated by the dotted vertical straight lines. Thus it is for instance achieved that the light for copying the image parts allotted to the central filter zone diffuses less into the parts of the image designed for the lateral filter zones than vice versa. The diffusion into the adjoining zone is strongest for the light passing through the apparent lens opening 15$^{IV}$.

Another arrangement in accordance with the invention is represented in Figs. 4 and 5. In this case three images 16, 16' and 16" are produced of lens opening 14, whereas opening 14 of the objective itself cannot be directly seen from the films.

Each image is reflected through a pair of mirrors arranged in parallel under one another, which are inclined to the optical axis of the objective. For the three images 16', 16, 16", there are thus necessary three such pairs of mirrors, 17, 20; 18, 21; 19, 22; which are arranged at an angle of 60 degrees to each other between the film and the objective. On the other side of the objective, there are corresponding pairs of mirrors, 23, 26; 24, 27; 25, 28.

First of all the course of the rays leading via the four mirrors 17, 20, 23 and 26 will be described. These mirrors, which are in parallel with each other, and inclined against the optical axis, are so arranged that from the films images of the objective can be seen beyond the optical axis. Furthermore, the two films are seen in exactly opposite directions from the objective.

As shown in Fig. 5, the other mirrors, apart from the four mirrors above-described, are so arranged that in the two sections through the optical axis of the objective which together with the section represented in Fig. 4 form angles of 60 degrees, the trace of the rays is exactly the same as in the section shown in Fig. 4. Four mirrors each are arranged perpendicularly to each of the planes inclined by 60 degrees. One pair of mirrors belonging together is, for instance, formed by mirrors 18 and 21. By means of these two mirrors image 16 of lens aperture 14 is therefore seen from film 1. By means of mirrors 17 and 20 image 16' is seen, and mirrors 19 and 22 serve for producing image 16". In the same way each pair of other mirrors arranged in parallel with each other on the other side of the objective serves for producing an image of the objective which is at 180 degrees to the image produced by the two corresponding mirrors on the other side of the lens.

In order to avoid that the opening 14 of the objective can be seen directly from the films, diaphragms 29 to 32 are preferably arranged in a perpendicular position to the optical axis in a suitable manner. Their shape can for instance be seen from Fig. 5, which represents diaphragm 29 in plan.

The distances of lens images 16, 16' and 16" are so dimensioned that each of these images is seen in a direction which coincides with directions in which the various zones of the color filter used for exposure or reproduction can be seen. Here again the lens images are preferably situated in such directions in which the centers of the filter zones can be seen when exposing or reproducing. The mirrors can further be so arranged that the connecting line between images 16 and 16" is vertical to the direction of the lenticular elements. It is, however, not necessary that the two above-mentioned sections producing the same course of rays as shown in Fig. 4 together with the plane of the section shown in Fig. 4 form angles of 60 degrees. The planes may also form angles which are somewhat larger or smaller, thus enlarging or diminishing the distance between images 16 and 16". The distance of the images from the axis of the objective can be enlarged or diminished by correspondingly inclining mirrors 17–28 towards the optical axis. Just as in the case of the other arrangements in accordance with the invention it is furthermore necessary that from the original film the lens images are seen in the same distance from the film as the color filter used for the exposure, and that correspondingly from the copying film the lens images are seen in the same distance as the color filter used for reproduction. In order to produce the distances as desired, field lenses may be used in some cases, which are placed before the gates.

Whereas in the case of the arrangements represented in Figs. 4 and 5 the mirrors must be so arranged that in the three different planes laid through the optical axis the same course of rays is produced, so that three lens images different from each other can be seen, it is in the case of the arrangement represented in Figs. 6 and 7 only necessary to provide mirrors in two of such section planes. Between the films and the objective an optical square is arranged on each side, the edge of which is in parallel to the optical axis and the angle of which is exactly 90 degrees. The optical squares are formed by the plane mirrors 33–36. From film 1, for instance, images 37 and 37' of the lens aperture can be seen, which are produced by reflection in one each of mirrors 33 or 34. By successive reflection in both mirrors image 37" is produced. It is now possible to insert diaphragms 38 and 39 into the trace of the rays in such a way that opening 14 of the objective cannot be seen directly from the films. By suitably dimensioning the distance between the optical squares and the optical axis images 37, 37" must be placed in such a position that they can be seen in directions which coincide with such directions in which parts of the filter zones can be seen from the films when exposing or projecting.

The above mentioned advantage that in the case of the arrangement represented in Figs. 6 and 7 the same course of rays has to be produced only in two sections going through the optical axis which are inclined towards each other, stands against the drawback that mirrors 33 and 34 on the one hand and 35 and 36 on the other hand must form very accurate angles of 90 degrees. In the case of the arrangements represented in Figs. 1–5, on the other hand, it is not necessary to adhere to angles of a definite size.

In Figs. 8 and 9, an arrangement is shown which serves for the exposure of images on lenticulated films; ensuring that the exposed images are free from colored fringes and that they do not show any dominants caused by the effect of the cat's eye. Part of this exposure arrangement is designed exactly like a copying machine and may also be used for copying films.

By an objective 40 an image is produced of the objects to be photographed. In the plane of this image there is arranged a focussing screen, which is preferably designed as lenticulated film 41, goffered on both sides. This image of the objects to be photographed is still produced without dividing it into the various colors; it must therefore be free from color fringes and dominants. Due to the fact that in the plane of this image there is arranged a focussing screen or preferably a lenticulated film which is goffered, on both sides, the image produced on the plane of the lenticulated film—irrespective of whether it is wholly or only partially sharp—is divided into image elements, and only the light rays reproducing each element on the lenticulated film 2 are decomposed in accordance with the colors. In this way the plane image and not the three-dimensional image is decomposed, so that no color fringes can occur. It is likewise impossible for dominants to occur, even if lens 40 is vignetted towards its edge.

The reproduction of the image formed in film 41 on the copying film 2 fully corresponds to a copy of one lenticulated film on another. The portion of the arrangement between films 41 and 2 can therefore also be used for copying almost without any alteration; in this case film 1 to be copied is used instead of film 41.

Film 41 is imaged on film 2 by means of objective 3. On both sides of the lens there are arranged three plane mirrors 42–47 in parallel to the optical axis. The three mirrors 42, 43 and 44 which are on one side of the lens are inclined towards each other and are arranged as shown in the sectional drawing of Fig. 9. On the other side of the objective the mirrors 45, 46 and 47 are arranged diametrically to the first-named mirrors. The trace of the rays is the same as in the case of the arrangement shown in Figs. 1 and 2, from which it differs only insofar as in addition to the two mirrors arranged on each side a third mirror is provided on each side so that from the films there images each of the objective can be seen. In order to avoid that the objective is seen directly, diaphragms 48 and 49 are again provided in the trace of the rays.

It will be obvious to those skilled in the art that by using color filters the invention may be applied to cameras or projectors as well as to copying apparatus. It is also obvious that other changes in details may be made without departing from the scope of the invention as defined in the appended claims.

We claim:

1. In combination, an original film having thereon a multiplicity of lenticulations and a group of color records behind each of said lenticulations, a copy film having similar lenticulations thereon, means for projecting light through the original film to the copy film, a lens disposed in the path of light passing between said films, and two sets of mirrors, each set disposed between said lens and one of said films and comprising a plurality of mirrors arranged with said lens to produce at said one film more than two images of said lens and which images are out of line with each other.

2. In combination, an original film having thereon a multiplicity of lenticulations and a group of color records behind each of said lenticulations, a copy film having similar lenticulations thereon, means for projecting light through the original film to the copy film, a lens disposed in the path of light passing between said films, and two sets of mirrors, each set disposed between said lens and one of said films and comprising a plurality of mirrors arranged with said lens to produce at said one film more than two images of said lens and which images are out of line with each other and are disposed at the corners of a polygon, as viewed along the optical axis of the lens.

3. In combination, an original film having thereon a multiplicity of lenticulations and a group of color records behind each of said lenticulations, a copy film having similar lenticulations thereon, means for projecting light through the original film to the copy film, a lens disposed in the path of light passing between said films, and two sets of mirrors, each set disposed between said lens and one of said films and comprising a plurality of mirrors arranged to produce at said one film more than two images of said lens and which images are out of line with each other.

4. In combination, an original film having thereon a multiplicity of lenticulations and a group of color records behind each of said lenticulations, a copy film having similar lenticulations thereon, means for projecting light through the original film to the copy film, a lens disposed in the path of light passing between said films, two sets of mirrors, each set disposed between said lens and one of said films and comprising a plurality of mirrors arranged to produce at said one film more than two images of said lens and which images are out of line with each other, and means preventing formation of an image directly by said lens.

5. In combination, an original film having thereon a multiplicity of lenticulations and a group of color records behind each of said lenticulations, a copy film having similar lenticulations thereon, means for projecting light through the original film to the copy film, a lens disposed in the path of light passing between said films, and two sets of mirrors, each set disposed between said lens and one of said films and comprising a plurality of mirrors extending parallel to the optical axis of the lens but disposed with their surfaces forming angles to each other, each mirror in one set being duplicated by a mirror in the other set.

6. In combination, an original film having thereon a multiplicity of lenticulations and a group of color records behind each of said lenticulations, a copy film having similar lenticulations thereon, means for projecting light through the original film to the copy film, a lens disposed in the path of light passing between said films, and two sets of mirrors, each set disposed between said lens and one of said films and comprising a plurality of mirrors extending parallel to the optical axis of the lens but disposed with their surfaces forming angles to each other, each mirror being adapted to form an image of said lens at one of said films.

7. In combination, an original film having thereon a multiplicity of lenticulations and a group of color records behind each of said lenticulations, a copy film having similar lenticulations thereon, means for projecting light through the original film to the copy film, a lens disposed in the path of light passing between said films, and two sets of mirrors, each set disposed between said lens and one of said films and comprising a plurality of mirrors extending lengthwise of the optical axis of the lens but disposed with their surfaces forming angles to each other, each mirror in one set being duplicated by a mirror in the other set.

8. In combination, an original film having thereon a multiplicity of lenticulations and a group of color records behind each of said lenticulations, a copy film having similar lenticulations thereon, means for projecting light through the original film to the copy film, a lens disposed in the path of light passing between said films, and two sets of mirrors, each set disposed between said lens and one of said films and comprising a plurality of mirrors extending lengthwise of the optical axis of the lens but disposed with their surfaces forming angles to each other, each mirror being adapted to form an image of said lens at one of said films.

KURT RÄNTSCH.
HANS ARNI.